Patented May 18, 1937

2,080,863

UNITED STATES PATENT OFFICE 2,080,863

ANTISEPTIC

Wilton C. Harden, Catonsville, Md., assignor to Hynson, Westcott & Dunning, Incorporated, Baltimore, Md., a corporation of Maryland No Drawing. Application February 10, 1936, Serial No. 63,263

6 Claims. (Cl. 167—70)

This invention relates to antiseptics and to certain new compounds having antiseptic properties. I have found that halogen substituted dihydroxy-benzoic acids and especially the dihalogen substituted dihydroxy-benzoic acids possess bacteriological and physiological properties adapting them for use as therapeutic agents, especially as urinary antiseptics. Most of the chlorine and bromine substituted dihydroxy-benzoic acids were known prior to the present invention and with respect to such known compounds I only claim to have discovered their antiseptic or bactericidal properties, but the di-iodo dyhydroxy-benzoic acids and especially the di-iodo resorcylic acids are believed to be new compounds as well as novel therapeutic agents. These compounds are suitable for therapeutic use with respect to both physical and chemical properties. They are crystalline, stable solids, odorless and sufficiently soluble in the usual vehicles and in the body fluids to render their clinical use satisfactory.

Following their oral administration they may be detected in the urine which will be found to have been rendered either bacteriostatic or bactericidal.

In connection with the study of the bacteriological properties of these compounds it is to be specifically noted that the usual in vitro tests do not in any way measure the clinical efficacy of the compounds when they are actually used in practice as urinary antiseptics. For example, it has been noted that a concentration of some of these compounds which is not bactericidal when tested by the usual in vitro methods still produces a bactericidal urine following ingestion by animals or humans. It may be, therefore, that the compounds are either partially decomposed or conjugated with some other substance in the body and, as a consequence of this, become more efficacious as bactericides.

Both pharmacological and clinical investigations of these compounds indicate that they are apparently without effect on the blood pressure, pulse rate, respiration, or kidney function of the animals to which they have been given in therapeutic doses, nor have any other untoward disturbances, such as up-sets of the digestive system, been noted in the course of their clinical investigation.

The toxicity of the compounds as determined by both oral administration and intravenous injection is very low. Doses of as much as 1 gram per kilogram of body weight administered to rabbits produced no harmful effect, and doses of as much as 50 grains per day have been administered to human subjects without toxic effect.

With respect to their efficacy as bactericidal agents I prefer the di-iodo derivatives of dihydroxy-benzoic acid and especially the di-iodo resorcylic acids, i. e. the di-iodo derivatives of alpha, beta and gamma resorcylic acids. The preparation of the compounds is illustrated in the following example:

One mole of resorcylic acid is dissolved in 600 cc. of alcohol. 210 cc. of hydrochloric acid is added and the mixture is brought to a temperature of 0° C. To this solution is added a solution of 203.2 grams of iodine and 85.6 grams of potassium iodate which has been previously dissolved in a calculated amount of sodium hydroxide. This solution is added at such a rate that with adequate cooling the temperature does not rise above 15° C. The resulting crystalline mass is cooled over night, filtered by suction, and recrystallized from suitable solvents such as alcohol or ethylene dichloride. The graphic formula of this compound is:

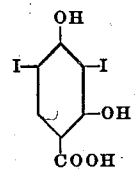

Of all such compounds, my investigations up to the present indicate a preference for the di-iodo beta resorcylic acid, although it is appreciated that further investigation may indicate a preference for some other of the many species of the broad group of halogen derivatives of dihydroxy-benzoic acid.

The clinical use of the compounds is illustrated by the following:

Five grain doses of di-iodo beta resorcylic acid are administered to human patients every two hours until a total of 25 grains has been administered. After an interval of four to six hours from the time of the initial dose urine samples are collected and tested bacteriologically. Such specimens from normal patients are found to be germicidal and remain so for 24 hours or more. Specimens from patients having urinary infections show a decrease in the bacterial colony count and succeeding specimens taken at two hour intervals frequently are found to be sterile and germicidal. This germicidal property frequently persists in urine samples taken thirty six to forty hours after administration of the drug.

I claim:

1. An antiseptic agent for internal administration as a urinary antiseptic comprising a di-halogen substituted dihydroxy-benzoic acid.

2. An antiseptic agent for internal administration as a urinary antiseptic comprising a di-iodine substituted dihydroxy-benzoic acid.

3. An antiseptic agent for internal administration as a urinary antiseptic comprising di-iodo resorcylic acid.

4. An antiseptic agent for internal administration as a urinary antiseptic comprising di-iodo alpha resorcylic acid.

5. An antiseptic agent for internal administration as a urinary antiseptic comprising di-iodo beta resorcylic acid.

6. An antiseptic agent for internal administration as a urinary antiseptic comprising di-iodo gamma resorcylic acid.

WILTON C. HARDEN.